United States Patent

Hopkins et al.

[15] 3,640,084

[45] Feb. 8, 1972

[54] REFRIGERATION SYSTEM AND METHOD

[72] Inventors: Neil E. Hopkins, York, Pa.; Paul W. Muench, Medford Lakes, N.J.

[73] Assignee: Borg-Warner Corporation, Chicago, Ill.

[22] Filed: Aug. 24, 1970

[21] Appl. No.: 66,260

[52] U.S. Cl.................................62/101, 62/476, 62/485, 165/105
[51] Int. Cl........................................F25b 15/06
[58] Field of Search................62/101, 181, 196, 476, 485, 62/513; 165/105

[56] References Cited

UNITED STATES PATENTS

2,244,312   6/1941   Newton...................62/181
2,718,766   9/1955   Imperator et al..............62/79
3,122,002   2/1964   Miner et al..............62/476 X Primary Examiner—William F. O'Dea
Assistant Examiner—P. D. Ferguson
Attorney—Donald W. Banner, William S. McCurry and John W. Butcher

[57] ABSTRACT

An alternative method of operating a refrigeration system of the type normally operated in an absorption refrigeration cycle. When a cooling medium such as water is available at temperatures below a chilled fluid temperature which will satisfy the refrigeration load, the absorption refrigeration cycle is suspended, the supply of heat to the generator being discontinued, and the absorber is operated as a condenser to liquefy the refrigerant vaporized in the evaporator. Means are provided for operating the system in such a manner.

14 Claims, 1 Drawing Figure

PATENTED FEB 8 1972

3,640,084

INVENTORS
Neil E. Hopkins
Paul W. Muench
BY
H. Lawrence Smith
ATTORNEY 3,640,084

REFRIGERATION SYSTEM AND METHOD

BACKGROUND OF THE INVENTION

The present invention relates generally to a method of and means for operating a refrigeration system which is normally operated in an absorption refrigeration cycle, and more particularly, to a method of and means for operating such a system in an alternative refrigeration cycle when a cooling medium is available at temperatures lower than a temperature of the chilled fluid which will satisfy the refrigeration load.

In a typical absorption refrigeration system a liquid is circulated in a chilling coil forming a portion of an evaporator in which a refrigerant is vaporized to abstract heat from the liquid. The liquid thus chilled is conducted to a refrigeration load, such as one or more remotely located air-conditioning units, the vaporized refrigerant passing to an absorber for absorption by a solution having a strong affinity for the refrigerant. The absorbent solution is diluted by the absorption process, and the heat of solution thus generated is removed by circulating a cooling medium in a cooling coil provided in the absorber. The dilute solution is conducted from the absorber to a generator, where it is heated to evaporate refrigerant, thereby increasing the concentration of the solution. The concentrated solution is returned to the absorber, and the evaporated refrigerant is liquefied in a condenser from which it is returned to the evaporator to complete the absorption refrigeration cycle. The evaporator and the absorber are maintained at substantially lower pressures than the generator and the condenser. Water is frequently used as the refrigerant, the chilled fluid and the cooling medium, a suitable source of heat in the generator being steam or hot water circulated in a heating coil. When the refrigerant is water, the absorbent solution is typically a hygroscopic brine such as an aqueous solution of lithium bromide or lithium chloride. It is to be noted, however, that a large number of fluids with widely varying characteristics are suitable for use in absorption refrigeration systems.

The absorber cooling coil often conveniently forms a portion of a cooling circuit which also includes a condenser coil, situated in series with the cooling coil, for abstraction heat from the refrigerant evaporated in the generator to reduce it to condensate. The cooling water is conducted from the condenser coil to a remote location where the heat abstracted in the absorber and in the condenser is rejected to ambient air, usually the air out of doors. Alternatively, and where feasible, the cooling water may be drawn from a body of water such as a lake, a stream, an artificial pool or a deep well, and returned thereto, the body of water thus forming a portion of the cooling circuit.

The temperature of the heated cooling water must be so related to the temperature of the ambient air as to provide a favorable heat-transfer relationship. Since refrigeration requirements are usually greatest during periods of high ambient temperatures, absorption refrigeration systems are customarily designed to be operated with correspondingly high cooling-water temperatures, and it has been considered necessary for stable operation of the system to provide controls which act to maintain these temperatures within a substantially narrow range despite diurnal and seasonal fluctuations in the ambient temperature.

On the other hand, a need for refrigeration may arise or continue to exist during periods of relatively low ambient temperatures, although the refrigeration load is usually lighter under such conditions. During periods of extremely low ambient temperatures; for example, during the winter months in the temperate zones, it would often be possible to provide cooling water at a temperature actually lower than a chilled water temperature which would satisfy the refrigeration load, and in many cases such a temperature relationship could be maintained for extended periods of time. However, as noted above, the cooling water temperature is conventionally maintained within a relatively high range of values at all times. This anomalous condition must be considered inefficient, if not wasteful, and a number of proposals have been advanced for making use of low-temperature cooling water, when available, to reduce the amount of energy required to operate the system.

More particularly, it has been suggested that the low-temperature cooling water might be introduced directly into the chilled water circuit for circulation to the refrigeration load, the remainder of the system being inoperative. However, for optimum rejection of heat, the cooling water is normally brought into direct contact with the ambient air, as by being sprayed through a stream of air, thereby causing the cooling water to acquire substantial amounts of contaminants in both entrained and dissolved form. Similarly, liquid drawn from a body of water is rarely pure. While the components of the cooling circuit may be designed to function satisfactorily in the presence of contaminated or dirty water, the chilled water circuit is ordinarily intended to circulate relatively pure water to maintain effective transfer of heat at the units representing the refrigeration load, and elements of the chilled water circuit are not readily accessible for cleaning or flushing operations. In some installations for example, components of the cooling circuit are formed of a corrosion-resistant alloy at the sacrifice of some thermal conductivity, whereas components of the chilled water circuit are typically formed of a metal such as copper which is highly conductive of heat but which has relatively low resistance to certain types of corrosion.

It has also been suggested that the low-temperature cooling water and the water to be chilled might be brought into heat-transfer relation in a simple heat-exchanger. Since only the exchange of sensible heat would be effected, however, and since the temperature differential is frequently only a few degrees, the heat-transfer surface would necessarily be extremely large, with attendant pumping and circulation problems.

In U.S. Pat. No. 2,718,766, issued Sept. 27, 1955 to T. Imperatore et al., there is shown and described an air-conditioning apparatus of the type which is normally operated in a vapor-compression cycle but which may be operated alternatively with relatively cold condenser water by conducting the refrigerant vapor directly from the cooler or evaporator to the condenser; that is, by bypassing the compressor. An equalizer pipe interconnecting the evaporator and the condenser, together with an associated control valve, must be provided for this purpose. A refrigerant pump and a spray pipe must also be added to the system to forward liquid refrigerant from the evaporator sump and distribute it over the chilling coil in the evaporator in order to increase the heat-transfer rate between the refrigerant and water circulated in the chilling coil. Also necessary are controls which prevent simultaneous operation of the compressor and the refrigerant pump. A saving in energy is said to be realized during periods in which relatively cold condenser water is available, since the compressor is inoperative during such periods.

The apparatus disclosed in the aforementioned patent is entirely unlike an absorption refrigeration system in structure and principles of operation, and it is to be noted that the condenser and evaporator continue to function in the customary manner during periods in which low-temperature condenser water is used, except that the heat-transfer rate is increased in the evaporator by the operation of the added refrigerant pump and spray pipe. Operation of the primary source of energy put into the system, namely the compressor, is simply discontinued. If an attempt were made to operate an absorption refrigeration system in this manner, that is, if the supply of heat to the generator were simply interrupted and vaporized refrigerant bypassed directly from the evaporator to the condenser, the system would cease to function without substantial and costly additional measures being taken, regardless of the temperature of the cooling medium in the condenser.

With these considerations in mind, persons skilled in the absorption refrigeration art have for some time sought a practicable and economically feasible way in which to make use of a cooling medium at relatively low temperatures, when available, in order to take advantage of the saving in energy to be gained by such use.

SUMMARY OF THE INVENTION

It is therefore a primary object of the present invention to provide a substantial reduction in the amount of energy required to be put into a refrigeration system of the type herein described when a cooling medium is available at a temperature lower than a temperature of the chilled fluid which will satisfy the refrigeration load.

It is also an object of the invention to provide a method of operating such a system which will permit utilization of a cooling medium at a temperature lower than a temperature of the chilled fluid suitable for satisfying the refrigeration load.

It is a further object of the invention to provide an economically advantageous method of, and relatively inexpensive means for, operating such a system when a cooling medium is available at a temperature lower than a temperature of the chilled fluid which will satisfy the refrigeration load.

In accordance with the invention the absorption refrigeration cycle is suspended and the absorber is operated to condense refrigerant vaporized in the evaporator. This is done by removing absorbent solution from the absorber, circulating the cooling medium in the absorber at a temperature lower than a temperature of the chilled fluid which will satisfy the refrigeration load, and returning refrigerant condensed in the absorber directly to the evaporator.

Also in accordance with the invention, there are provided a bypass passage between the absorber and the evaporator, and a valve associated with the bypass passage which may be opened to permit circulation of refrigerant condensed in the absorber to the evaporator. In a preferred embodiment of the invention the bypass passage conveniently connects the absorber with a refrigerant passage already provided in many existing systems.

THE PREFERRED EMBODIMENT

Figure 1:
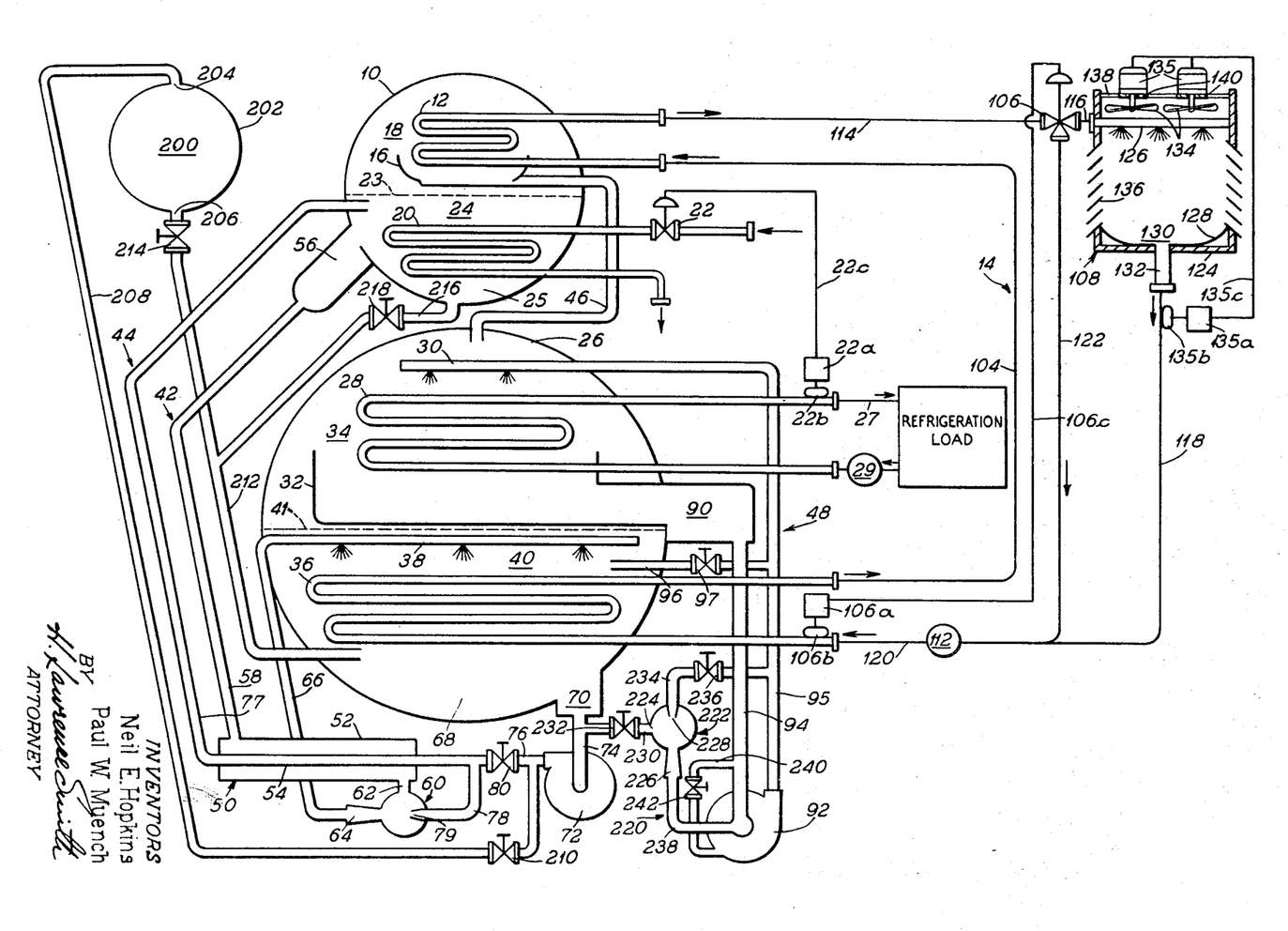
The FIGURE is a schematic representation of a refrigeration system constructed and adapted to be operated in accordance with the present invention.

The refrigeration system shown in the drawing is one which is intended for normal operation in an absorption refrigeration cycle and which is particularly well adapted for application of the principles of the invention, although it will be obvious that the invention can be applied with facility to other absorption refrigeration systems.

Referring to the figure, an upper shell 10 encloses a heat-exchanger 12, hereinafter referred to as the condenser coil and forming a portion of a cooling circuit 14. Positioned below condenser coil 12 is a receptacle means in the form of a pan 16 which cooperates with condenser coil 12 and the upper portion of shell 10 to provide a condenser 18.

In the lower portion of shell 10 there is provided a heat-exchanger 20, hereinafter referred to as the heating coil, in which flow of a heating medium such as steam or hot water is regulated by a valve 22, the direction of flow being indicated by arrows. Valve 22 is connected to a control means 22a by a control line 22c. Control means 22a is, in turn, connected in any suitable manner to a temperature-sensitive element 22b. Heating coil 20 forms a portion of a heating circuit which also includes pump means as necessary, and a suitable source of heat, neither of which is shown. The lower portion of shell 10 and the heating coil 20 cooperate to provide a generator 24, a generator sump 25 being formed by the lowermost portion of shell 10. A dashed line 23 represents an imaginary plane of demarcation between condenser 18 and generator 24.

A lower shell 26 encloses a heat-exchanger 28, hereinafter referred to as the chilling coil, which forms a portion of a chilling circuit indicated generally at 27 and arranged to circulate chilled fluid to a refrigeration load represented schematically but typically consisting of one or more air-conditioning units. Also included is a pump 29. The direction of flow in chilling circuit 27 is indicated by arrows. Positioned above chilling coil 28 is a refrigerant distribution means in the form of a spray header 30 having spray nozzles arranged to distribute refrigerant over chilling coil 28 in heat-exchange relation therewith. Below chilling coil 28 is a receptacle means in the form of a pan 32 for collecting liquid refrigerant. Chilling coil 28, spray header 30, pan 32, and the upper portion of shell 26 cooperate to provide an evaporator 34.

Below pan 32 there is provided a heat-exchanger 36, hereinafter referred to as the cooling coil, which forms a portion of cooling circuit 14, condenser coil 12 being arranged in series with cooling coil 36. A spray header 38 positioned above cooling coil 36 is provided with a number of spray nozzles. Spray header 38, the lower portion of shell 26 and cooling coil 36 cooperate to provide an absorber 40, the nozzles of spray header 38 being arranged to distribute an absorbent solution in the upper portion of absorber 40. A dashed line 41 represents an imaginary plane of demarcation between evaporator 34 and absorber 40.

Condenser 18, generator 24, evaporator 34 and absorber 40 are connected in a closed circuit for conducting the refrigerant and the absorbent solution in an absorption refrigeration cycle. The closed circuit also includes a concentrated solution passage means 42, a dilute solution passage means 44, a condensate line 46, and a refrigerant passage means 48. A tube-and-shell heat-exchanger, represented schematically at 50, includes a shell side 52 which forms a portion of concentrated solution passage means 42, and a tube side 54 which forms a portion of dilute solution passage means 44. Concentrated solution passage means 42 also includes a concentrated solution receiver 56 communicating with generator 24, and a line 58 connecting concentrated solution receiver 56 with shell side 52 of heat-exchanger 50. An eductor 60 is also included in concentrated solution passage means 42, the eductor having an outlet 64 and a suction inlet 62, the latter communicating with shell side 52. A line 66 connecting eductor outlet 64 and spray header 38 completes concentrated solution passage means 42.

An absorber sump 68 is formed by the lowermost portion of shell 26 and communicates with a dilute solution receiver 70 which forms a portion of dilute solution passage means 44. The latter also includes a solution pump 72, a line 74 connecting the solution pump inlet and dilute solution receiver 70, a line 76 connecting the solution pump outlet and tube side 54 of heat-exchanger 50, and a line 77 connecting tube side 54 and generator 24. A branch line 78 connects line 76, and thus the outlet of solution pump 72, with a motive fluid inlet 79 of eductor 60.

A valve 80 is provided in line 76 for purposes to be explained hereinafter, valve 80 being normally maintained in a fully open position to permit unobstructed flow through line 76 during operation of the system in an absorption refrigeration cycle.

Condensate line 46 connects pan 16 with evaporator 34 for delivery of condensed refrigerant to the evaporator. Refrigerant passage means 48 connects pan 32 with spray header 30 and includes a refrigerant receiver 90 communicating with pan 32, a refrigerant pump 92, a line 94 connecting refrigerant receiver 90 with the refrigerant pump inlet, and a line 95 connecting the refrigerant pump outlet with spray header 30. A blowdown line 96 communicates at one end thereof with line 95 and at the other end thereof with absorber 40. A blowdown valve 97, which is normally closed, is provided to control flow through the blowdown line.

In addition to condenser coil 12 and cooling coil 36, cooling circuit 14 includes a line 104 for conducting a cooling medium from cooling coil 36 to condenser coil 12, a three-way valve 106, a cooling tower 108, a pump 112, a line 114 leading from condenser coil 12 to three-way valve 106, a line 116 leading from three-way valve 106 to cooling tower 108, a line 118 leading from cooling tower 108 to pump 112, a line 120 leading from pump 112 to cooling coil 36, and a bypass line 122 leading from three-way valve 106 to line 118. Arrows indicate the direction of flow in cooling circuit 14, including condenser coil 12, cooling coil 36 and bypass line 122. Three-way valve 106 is connected to a control means 106a by a control line 106c. Control means 106a is, in turn, connected by any suitable means to a temperature-sensitive element 106b.

Cooling tower 108 typically includes a housing 124, a spray header 126 communicating with line 116 and having a number of spray nozzles, a receptacle means in the form of a cold-water basin 128 forming a sump 130, a cooling medium receiver 132 communicating with sump 130 and with line 118, and a plurality of fans 134, which may be driven directly, as shown, by electric motors 135, or by intermediate speed reduction mechanisms (not shown). Motors 135 are connected to a control means 135a by a control line 135c. Control means 135a is, in turn, connected by any suitable means to a temperature-sensitive element 135b. Housing 124 is provided with a plurality of louvered intake openings 136, a number of exhaust openings 138, and suitable mounting supports 140 for fans 134 and motors 135.

With the exception of valve 80, the structure heretofore described is common to a great many existing absorption refrigeration systems. Any number of additional features or modifications may be found in such systems but do not play any part in the present invention and have been omitted for the sake of clarity. Among these, for example, are purge devices for the removal of noncondensible gases from the system, means for decrystallizing salts which may precipitate from solution in shell side 52 of heat-exchanger 50 under conditions of relatively high concentration, and a solution valve which may be associated with dilute solution passage means 44 for reducing the rate of flow of solution therein at reduced capacities. On the other hand, a number of features shown and described herein are not found in certain existing systems. This is particularly true of eductor 60, which is desirable when a single solution pump (72) is used. However, the invention is equally applicable to systems in which the eductor is omitted or in which a second solution pump in place of the eductor is provided to circulate solution to the absorber for distribution therein.

Turning now to the elements added to the conventional structure in the preferred embodiment of the invention, a receiver 200 is formed by a shell 202 and has an inlet 204 and an outlet 206. A receiver passage means in the form of a line 208 connects the receiver inlet 204 with the outlet of the solution pump 72, or more specifically, with the line 76. The receiver line 208 is provided with a valve 210 for controlling flow therethrough, valve 210 being closed during operation of the system in an absorption refrigeration cycle. As previously mentioned, valve 80 is arranged to permit open flow of solution in concentrated solution passage means 44 during normal operation and at other times to prevent flow therethrough, for purposes which will be made clear hereinafter. A second receiver passage means in the form of a receiver drain line 212 connects receiver outlet 206 and absorber 40. Flow from receiver outlet 206 is controlled by a valve 214 in drain line 212 which is normally closed.

Generator sump 25 and receiver drain line 212 are interconnected by a generator drain line 216 provided with a valve 218. Valve 218 is closed during normal operation of the system but may be opened to remove absorbent solution from generator 24 to absorber 40 for purposes which are explained below. Generator drain line 216 is shown for convenience as opening into receiver drain line 212 but may be independently connected to absorber 40. It should be noted that a valve-controlled drain line interconnecting the generator and the absorber is found in some existing systems.

A refrigerant bypass passage means is indicated generally at 220 and preferably includes an eductor 222 having a suction inlet 224, an outlet 226 and a motive fluid inlet 228. A bypass line 230 connects eductor suction inlet 224 with line 74 and thus with dilute solution receiver 70 and absorber sump 68. Control of flow through bypass line 230 is effected by a valve 232 which is closed during operation of the system in an absorption refrigeration cycle. In addition to eductor 222, bypass line 230 and bypass valve 232, bypass passage means 220 includes a motive fluid line 234 connecting motive fluid inlet 228 with line 95 and thus with the outlet of refrigerant pump 92. Flow in motive fluid line 234 is controlled by a valve 236 which is normally closed. Bypass passage means 220 also includes a line 238 connecting eductor outlet 226 with the inlet of refrigerant pump 92.

A pump coolant line 240 connects line 94 with an internal coolant circuit (not shown) of refrigerant pump 92. Flow in coolant line 240 is controlled by a valve 242 which is closed during operation of the system in an absorption refrigeration cycle.

For purposes of this description it will be assumed that water is used as the refrigerant, as the cooling medium in cooling circuit 14, and as the fluid to be chilled in chilling coil 28 for circulation to the refrigeration load; that the heating medium circulated in heating coil 20 is steam; and that the absorbent solution is an aqueous solution of lithium bromide which may also contain suitable additives for improved heat transfer performance and the inhibition of corrosion. As previously noted, other fluids may be employed, and the invention is in no way restricted to the use of the foregoing substances.

NORMAL OPERATION

Normal operation; that is, operation of the system in an absorption refrigeration cycle, will now be described. It will be understood that the expressions "normal" and "normally" as used herein refer to such operation.

The pressure in lower shell 26 is maintained at a value (for example, about 7 mm. Hg absolute of 1/100 atmosphere) substantially lower than the pressure in upper shell 10 (for example, about 75 mm. Hg absolute or 1/10 atmosphere). The force of gravity and the pressure differential induce flow of condensed refrigerant from condenser pan 16 through condensate line 46 to the upper portion of evaporator 34 where a fraction of the condensed refrigerant flashes into vapor. As condensate entering the evaporator is vaporized, heat is abstracted from the water circulating in chilling coil 28, unvaporized refrigerant being collected in evaporator pan 32 from which it is conducted by way of refrigerant receiver 90, line 94, refrigerant pump 92 and line 95 to spray header 30, valve 236 being closed during this phase of operation. The liquid refrigerant is distributed by spray header 30 over chilling coil 28 for further vaporization and consequent abstraction of additional heat from the water to be chilled. Any unvaporized refrigerant will continue to be collected by pan 32 for recirculation to spray header 30.

The refrigerant vaporized in evaporator 34 passes to absorber 40, owing to a slight pressure differential within shell 26 which arises from the absorption process and the effect of the sprays issuing from the nozzles of spray header 38. The vaporized refrigerant comes into contact with and is absorbed by the solution issuing from the spray header. The solution is thereby diluted as it falls to absorber sump 68, the heat of solution being abstracted by the cooling water circulated in cooling coil 36.

The dilute absorbent solution is removed from absorber sump 68 by way of dilute solution receiver 70 and line 74, solution pump 72 acting to forward the dilute solution to generator 24 through line 76, tube side 54 of heat-exchanger 50, and line 77. Valve 80 is fully open and valve 232 closed during this phase of operation.

The dilute solution is heated in generator 24 by the steam circulating in heating coil 20, whereby refrigerant is evaporated from the solution. The evaporated refrigerant rises to condenser 18 where it is liquefied by the rejection of the heat of evaporation to the cooling water circulating in condenser coil 12, the liquid refrigerant being collected in pan 16 to complete the refrigerant cycle.

The evaporation of refrigerant from the absorbent solution in generator 24 increases the concentration of the solution, and the concentrated solution spills from generator sump 25 into concentrated solution receiver 56, valve 218 being closed during this phase of operation. The concentrated solution flows from receiver 56 through line 58 to shell side 52 of heat-exchanger 50, where it rejects heat to the dilute solution flowing through tube side 54. This exchange of heat enhances the efficiency of the system by cooling the concentrated solution to increase its capacity for absorption and by preheating the dilute solution on its way to generator 24. From shell side 52 the concentrated solution is drawn to suction inlet 62 of eductor 60. A portion of the flow of dilute solution from the outlet of solution pump 72 is diverted through branch line 78 to motive fluid inlet 79 of eductor 60 to provide a motive force for operation of the eductor. Consequently the concentrated solution entering suction inlet 62 and the dilute solution entering motive fluid inlet 79 are mixed in the eductor to provide a solution of intermediate concentration at outlet 64, the eductor acting to forward the intermediate solution through line 66 to spray header 38 for distribution in the upper portion of absorber 40, thus completing the absorbent solution cycle. As previously pointed out, eductor 60 may be omitted from some systems. In the absence of eductor 60, the force of gravity and the pressure differential between shells 10 and 26 may be relied upon to conduct the concentrated solution from generator 24 to absorber spray header 38. Alternatively, a second solution pump may be provided in place of eductor 60, as mentioned above. The second solution pump may be arranged to circulate solution of intermediate concentration to the spray header in the absorber as shown and described in, for example, U.S. Pat. No. 3,254,499, issued June 7, 1966 to N. E. Hopkins.

The water chilled in chilling coil 28 is circulated to the refrigeration load and returned to the chilling coil by the action of pump 29.

Capacity control is exercised by employing valve 22 to regulate the flow of steam through heating coil 20. Also, as previously mentioned, a solution control valve (not shown) may be associated with dilute solution passage means 44.

The position of valve 22 is normally controlled by control means 22a acting through control line 22c. Control means 22a is typically a thermostat device responsive to temperature-sensitive element 22b, the latter element being arranged to sense the temperature of the chilled water leaving chilling coil 28. In the typical system, the refrigeration load might call for a leaving chilled water temperature of 44° F. at full load. If control means 22a is a simple proportional control, a low-load condition might call for a controlled leaving chilled water temperature of 41° F., in which case the valve 22 would be in a throttling position. While this type of control has the advantages of simplicity and economy, it does not take into account the fact that at light load conditions the chilled water can be supplied at a somewhat higher temperature to the refrigeration load. In the alternative refrigeration cycle to be described below, advantage is taken of the fact that at the lighter load conditions the chilled water can be supplied to the load at temperatures somewhat above the full load design temperature.

Turning now to the operation of cooling circuit 14, the cooling water enters cooling coil 36 from line 120 and thus from the outlet of pump 112. After it has circulated in cooling coil 36 to abstract heat from the absorbent solution in absorber 40, the cooling water is led through line 104 to condenser coil 12 where it is circulated to liquefy the evaporated refrigerant by abstracting the heat of evaporation. Under design operating conditions; that is, with a heavy refrigeration load and high ambient temperatures, three-way valve 106 is positioned to permit open communication between lines 114 and 116 and to block flow through bypass line 122. Under such conditions the cooling water is conducted from the condenser coil 12 through line 114, valve 106 and line 116 to spray header 126 from which it issues downwardly in a series of sprays. Fans 134 are operated to draw the ambient air inwardly through louvered openings 136, upwardly through the cooling water sprays, and outwardly through exhaust openings 138, the air abstracting heat from the cooling water in its passage through the sprays, primarily by partial evaporation. The water thus cooled falls to sump 130 formed by cold water basin 138 and is conducted therefrom to the inlet of pump 112 by way of receiver 132 and line 118 to complete the cooling water cycle. For the reasons discussed earlier in this specification, the temperature of the cooling water entering cooling coil 36 is conventionally maintained at a relatively high value, the design temperature typically being between 75° F. and 90° F. Further, it has been considered desirable for stable operation to maintain the entering temperature within 2½° of the design temperature; that is, within a total range of 5°. This is accomplished by controlling the position of three-way valve 106 using control means 106a which acts through control line 106c. Control means 106a is typically a thermostat device responsive to temperature-sensitive element 106b, the latter element being arranged to sense the temperature of the cooling water entering cooling coil 36. Further control of the cooling water temperature is effected by operating fan motors 135, either by varying their speed or exercising on-off control. This is done by control means 135a acting through control line 135c. Control means 135a is typically a thermostat device responsive to temperature-sensitive element 135b, the latter element being arranged to sense the temperature of the cooling water leaving the cooling tower 108. For example, if the design temperature of the cooling water entering cooling coil 36 is 85° F., control means 135a might be set to energize fan motors 135 if the temperature at temperature-sensitive element 135c should rise to 80° F., and to deenergize the fan motors if the temperature should fall to 75° F. Three-way valve 106 acts to control the temperature of the cooling water by causing all or a portion of the flow, as necessary, to be bypassed around cooling tower 108 through bypass line 122. It should be pointed out that bypass line 122 is preferably located indoors in a heated space in order to avoid delivery of a slug of relatively cold water to cooling coil 36 and condenser coil 12 upon commencement of operation of the system. It will also be recognized that a bypass line such as line 122 may be equally useful when a body of water of variable temperature is employed in place of cooling tower 108.

For purposes of this description, normal operation of the system in the absorption refrigeration cycle, as heretofore described, will be referred to as phase A. During phase A valve 22 is open or partially open depending on the magnitude of the refrigeration load, valve 80 is fully open, valve 214 may be open, and valves 97, 210, 218, 232, 236 and 242 are closed. Chilled-water pump 29, solution pump 72, refrigerant pump 92 and cooling-water pump 112 are, of course, operative during phase A.

OPERATION IN ALTERNATIVE REFRIGERATION CYCLE

Now, by way of example, assuming that the design temperature of the cooling water entering cooling coil 36 is 85° F.; that the actual temperature has been maintained between 82.5° F. and 87.5° F. but that the temperature of the air out of doors has become sufficiently low that cooling water could be provided at a temperature of 44° F. or lower by making appropriate use of cooling tower 108; and that the present refrigeration load would be satisfied by chilled water leaving chilling coil 28 at a temperature of 50° F., the absorption refrigeration cycle can be discontinued and an alternative refrigeration cycle commenced in accordance with the present invention. In a typical system, a 6° difference between the chilled water and cooling water temperatures would permit operation in the alternative refrigeration cycle at 49.5 percent of design full load capacity in the absorption refrigeration cycle. The fraction of full load capacity is a function of the temperature difference whereby, in the same typical system, a 4° difference would permit 32 percent of full load capacity, and an 8° difference 67.5 percent.

To proceed from operation in an absorption refrigeration cycle to operation in the alternative refrigeration cycle, hereinafter called the free cooling cycle, or simply "free cooling," the system is first shut down temporarily and absorbent solution is removed from the absorber, this phase being referred to hereinafter as phase B. More particularly, control means 22a is overridden by any suitable means to close valve 22, halting the circulation of steam in heating coil 20 and thereby discontinuing the supply of heat to generator 24 and rendering generator 24 and condenser 18 inoperative. Operation of pump 112 is discontinued to halt circulation in cooling-water circuit 14. Pumps 29 and 92 may remain in operation.

At the commencement of phase B, valve 218 is opened to drain concentrated solution from generator 24 to absorber 40. This will prevent refrigerant vapor from being absorbed in the generator during operation in the free cooling cycle, thereby avoiding loss of refrigerant from the cycle and possible increase of solution in generator 24 to a level at which it might overflow into absorber 40 by way of concentrated solution passage means 42. At the same time, valves 80 and 214 are closed and valve 210 opened so that solution pump 72, which remains in operation, will now forward absorbent solution from absorber sump 68 to receiver 200 by way of line 208 and receiver inlet 204. Valves 97, 232, 236 and 242 remain closed during phase B.

In a typical system it will take approximately 10 to 15 minutes to transfer the absorbent solution from absorber 40 to receiver 200. This includes the solution which is drained from generator 24 to the absorber. It should be pointed out that receiver 200 and the associated lines (208, 212) and valves (80, 210, 214) are not essential, since the removal of absorbent solution from the system can be accomplished by discontinuing operation of solution pump 72 and draining absorbent solution from the absorber by any suitable means for storage in drums or other containers. A service drain (not shown) usually provided on solution pump 72 can be used for this purpose. Alternatively, the absorbent solution can be stored in the upper shell 10 by providing appropriate isolation valves. If receiver 200 is provided, however, it can also be used for other purposes since it permits convenient removal and storage of refrigerant, absorbent solution, or a mixture of both. This might be done, by way of example, for convenience in servicing a component of the system.

When the absorbent solution has been removed from absorber 40, operation of solution pump 72 is discontinued and valve 210 is closed to terminate phase B. A small amount of absorbent solution will remain in solution receiver 70, line 74 and solution pump 72. This residual solution will have little effect during operation in the free cooling cycle, as explained hereinafter, but can be removed if desired by way of the previously mentioned service drain on solution pump 72. Alternatively, a small service transfer pump (not shown) may be provided to transfer the residual solution to receiver 200.

Operation in the free cooling cycle may now be commenced, this phase of operation being referred to hereinafter as phase C. Refrigerant pump 92 remaining in operation, refrigerant is forwarded from pan 32 to spray header 30 with consequent vaporization of the refrigerant and abstraction of heat from the water circulated in chilling coil 28. Control means 106a is overridden by any suitable means to adjust three-way valve 106 to a position permitting full circulation of the cooling water to cooling tower 108, operation of pump 112 is resumed, and control of fan motors 135 is effected to provide the lowest possible cooling water temperature to a lower limit of a few degrees above freezing. For example, if the fan motors are started and stopped as the means of controlling fan capacity, control means 135a might be reset to energize the fan motors 135 if the temperature of the cooling water leaving the cooling tower 108 should rise to 40° F., and deenergize the fan motors if the temperature should fall to 26° F.

Absorber 40 will now act as a condenser, the vaporized refrigerant passing from evaporator 34 to absorber 40 to be reduced to condensate as it rejects the heat of vaporization to the cooling water circulated in cooling coil 36, the condensate falling to absorber sump 68. The reduction of vaporized refrigerant to condensate results in a pressure differential within shell 26 sufficient to draw vapor from evaporator 34 to absorber 40.

Valve 236 is opened to supply motive fluid to eductor 222, and valve 242 is opened to supply refrigerant to the coolant circuit (not shown) of refrigerant pump 92 in consideration of the additional load placed on the pump during operation in the free cooling cycle. Simultaneously, valve 232 is opened whereby eductor 222 withdraws condensed refrigerant from absorber sump 68 by way of solution receiver 70 and line 230, and forwards it to the suction side of refrigerant pump 72 by way of line 238.

The system can continue to be operated in phase C, that is, in the free cooling cycle, so long as it is possible to maintain the temperature of the cooling water entering cooling coil 36 at a value below a temperature of the chilled water which will satisfy the refrigeration load. This may be a matter of a number of hours in the event of an unseasonable and temporary lowering of the temperature of the ambient air, or it may amount to several months during the winter season in certain climates. During phase C valves 80, 97, 210 and 214 remain closed, valve 218 may also remain closed, and solution pump 72 remains inoperative. Most importantly, the major source of energy put into the system during operation in an absorption refrigeration cycle, namely the supply of heat to generator 24, is omitted during operation in the free cooling cycle by maintaining valve 22 closed, it being necessary to put energy into the system only at pumps 29 and 112 and refrigerant pump 92. Energy is also supplied to fan motors 135, but this may be intermittent since it is not required when the temperature of the ambient air is low enough to provide cooling water at a sufficiently low temperature without operation of fans 134.

If the residual solution is not removed from solution receiver 70, line 74 and solution pump 72, it will eventually form a mixture with the refrigerant, resulting in a solution concentration of approximately 5 percent by weight in a typical system. This amount of salt will result in only a small reduction in capacity and can easily be tolerated. For example, under the conditions described, the capacity might be reduced from the previously mentioned 49.5 percent of design full load capacity to 44.5 percent. Alternatively, a small still may be used to remove salt from the refrigerant to eliminate this small reduction in capacity. Such a still may be arranged to divert a small stream of refrigerant from the discharge of refrigerant pump 92 to a small boiler heated by electrical, steam or other heating means. The water driven off as vapor in the boiler would be directed to absorber 40 to be condensed on cooling coil 26. The solution remaining would be concentrated to approximately 55 percent concentration and directed to receiver 200 or heat-exchanger 50 for storage.

Now, if the temperature of the air out of doors should rise to a value at which it is not longer possible to provide cooling water at a sufficiently low temperature, operation in the free cooling cycle is discontinued and absorber 40 is again charged with absorbent solution, this phase of operation being referred to hereinafter as phase D. To commence phase D, valves 232 and 236 are closed, thereby ceasing operation of eductor 222 and halting the withdrawal of refrigerant from absorber sump 68. Operation of pumps 29, 92 and 112 is discontinued, and valve 242 is closed to halt delivery of refrigerant through line 240 to the coolant circuit of refrigerant pump 92. Pump 72 remains inoperative.

Valve 218 remains closed to prevent any further draining of solution from generator 24 to absorber 40. Next, valve 214 is opened to transfer the absorbent solution from receiver 200 to absorber 40 by way of line 212. Valves 80 and 210 remain closed during phase D.

When all the absorbent solution has been transferred from receiver 200, operation of the system in an absorption refrigeration cycle is resumed, this phase being referred to hereinafter as phase E, by opening valve 22 to resume the supply of heat to the generator, opening valve 80, and resuming operation of pumps 29, 72, 92 and 112. The position of three-way valve 106 is adjusted and control means 135a is reset as necessary to supply cooling water to cooling coil 36 at a temperature within the design range.

During phase E, all valves are positioned as in phase A except that blowdown valve 97 is opened slightly to divert a portion of the flow of refrigerant from line 95 to absorber 40 by way of blowdown line 96. This has the effect of speeding the separation of the small proportion of residual solution present in the refrigerant during operation in the free cooling cycle. If there is considerable excess capacity available, as there would normally be at the end of a cool season and the beginning of a warm season, the refrigerant can be purified in this manner at a relatively rapid rate. In a typical system, blowdown valve 97 can be closed in approximately one-half hour, whereby the system is returned to phase A; that is, fully normal operation in an absorption refrigeration cycle.

If the residual solution was removed from solution receiver 70, line 74 and solution pump 72 before initiation of the free cooling cycle, there is no need to open blowdown valve 97 at all, and phase E is thus omitted, the system being returned to phase A following or during phase D.

The various operating phases are summarized in table I hereof and the valve settings and pump operative conditions are given for each phase in table II hereof.

TABLE I

Phase A: Fully normal operation in absorption refrigeration cycle.

Phase B: Termination of absorption refrigeration cycle; removal of absorbent solution.

Phase C: Operation in alternative refrigeration cycle (free cooling cycle).

Phase D: Termination of alternative refrigeration cycle (free cooling cycle); return of absorbent solution.

Phase E: Resumption of operation in absorption refrigeration cycle with blowdown of refrigerant in preparation for return to phase A.

It will be noted that little modification of conventional or existing systems is required to practice the invention. As previously pointed out, a generator drain line such as the line 216 and an associated valve are already provided in some existing systems. It has also been pointed out that receiver 200 and the valves and lines associated therewith are not essential. Depending on the characteristics of the particular refrigerant pump employed, eductor 222, valves 236 and 242 and associated lines can also be omitted. Accordingly, many conventional or existing systems can be modified for operation in accordance with the present invention simply by adding a valve-controlled bypass line communicating at one end thereof with the absorber sump and at the other end thereof with the evaporator.

The various valves and pumps shown and described herein, including three-way valve 106, can be actuated manually in carrying out the method of the invention or they can be constructed and arranged for remote actuation, for example from a central control station, by employing any of a number of well-known mechanical, electrical, hydraulic and pneumatic devices. In addition, fully automatic operation of any or all of the valves and pumps can be effected by making appropriate use of any of several equally well known devices which are sensitive to temperature, pressure, rate of flow, fluid density, electrical conductivity or the like.

It should also be pointed out that free cooling should not be initiated if the degree of concentration of the absorbent solution is so great that crystallization might occur in receiver 200 or concentrated solution passage means 42 under expected conditions of temperature in the spaces in which they are located. Similarly, the degree of concentration should not be so low that an insufficient amount of refrigerant will be available for operation in the free cooling cycle, whereby refrigerant pump 92 might be subject to cavitation. When the system has been operating for some time in the absorption refrigeration cycle, the level of concentration will normally be within the range which satisfies these two requirements. However, well-known controls can be provided to prevent the commencement of phase B if the concentration level is outside the

TABLE II

| Phase | A | B | C | D | E |
|---|---|---|---|---|---|
| Valve: | | | | | |
| 22 | Open | Closed | Closed | Closed | Open. |
| 80 | do | do | do | do | Do. |
| 97 | Closed | do | do | do | Do. |
| 210 | do | Open | do | do | Closed. |
| 214 | Open | Closed | do | Open | Open. |
| 218 | Closed | Open | do | Closed | Closed. |
| 232 | do | Closed | Open | do | Do. |
| 236 | do | do | do | do | Do. |
| 242 | do | do | do | do | Do. |
| Pump: | | | | | |
| 29 | Operative | Operative | Operative | Inoperative | Operative. |
| 72 | do | do | Inoperative | do | Do. |
| 92 | do | do | Operative | do | Do. |
| 112 | do | Inoperative | do | do | Do. |

The procedure to be followed in converting the system from operation in an absorption refrigeration cycle to the free cooling cycle and vice versa has been divided into distinct phases for purposes of illustration. In actual practice the transition between phases is carried out in a smooth, continuous sequence as the corresponding conditions arise.

On the other hand, in describing the sequence of phases it has been assumed that refrigeration requirements call for virtually continuous operation of the system. It is entirely possible in many installations that the requirement for refrigeration may be intermittent or only occasional during periods in which conditions permit the system to be operated in the free cooling cycle. If the system is inoperative and a requirement for refrigeration arises when the conditions for free cooling are present, the system is placed in condition for operation in phase A and briefly operated in that phase before proceeding to phases B and C.

desirable range. Controls can also be provided which will initiate a mixing phase to reduce the concentration before phase B is commenced or, if concentration is too low, to continue operation in phase A until an acceptable level of concentration is achieved.

Also, if for any reason the concentration of salts in the refrigerant should rise to an unacceptable level during operation in the free cooling cycle, operation of the system can be returned temporarily to phase E (by way of phase D) until the concentration has been reduced satisfactorily. Free cooling can then be resumed by proceeding to phase B and then to phase C.

While the invention has been described in connection with a specific embodiment thereof, it is to be understood that this is by way of illustration and not by way of limitation; and the scope of the appended claims should be construed as broadly as the prior art will permit.

We claim:

1. In a method of operating a refrigeration system of the type having an evaporator and an absorber connected in a closed circuit for normally conducting a refrigerant and an absorbent solution in an absorption refrigeration cycle, the absorber being arranged in the closed circuit to receive refrigerant vaporized in the evaporator and normally being provided with absorbent solution for absorption of the vaporized refrigerant; means defining a chilling circuit for circulating a chilled fluid in heat-exchange relation with a refrigeration load and including a first heat-exchanger in the evaporator for abstracting heat from the fluid and rejecting it to the refrigerant to chill the fluid and to vaporize the refrigerant; and means defining a cooling circuit for circulating a cooling medium and including a second heat-exchanger in the absorber for normally abstracting heat from the absorbent solution and rejecting it to the cooling medium; the steps of operating the absorber to condense the vaporized refrigerant, in the absence of absorbent solution in the absorber, by circulating the cooling medium in the second heat-exchanger at a temperature lower than a temperature of the chilled fluid which will satisfy the refrigeration load; and circulating refrigerant condensed in the absorber to the evaporator.

2. In a method of operating a refrigeration system of the type having an evaporator and an absorber connected in a closed circuit for normally conducting a refrigerant and an absorbent solution in an absorption refrigeration cycle, the absorber being arranged in the closed circuit to receive refrigerant vaporized in the evaporator and normally being provided with absorbent solution for absorption of the vaporized refrigerant; means defining a chilling circuit for circulating a chilled fluid in heat-exchange relation with a refrigeration load and including a first heat-exchanger in the evaporator for abstracting heat from the fluid and rejecting it to the refrigerant to chill the fluid and to vaporize the refrigerant; and means defining a cooling circuit for circulating a cooling medium and including a second heat-exchanger in the absorber for normally abstracting heat from the absorbent solution and rejecting it to the cooling medium; the steps of removing absorbent solution from the absorber; operating the absorber to condense the vaporized refrigerant by circulating the cooling medium in the second heat-exchanger at a temperature lower than a temperature of the chilled fluid which will satisfy the refrigeration load; and conducting refrigerant condensed in the absorber to the evaporator.

3. In a method of operating a refrigeration system of the type having an evaporator, an absorber, a generator and a condenser connected in a closed circuit for normally conducting a refrigerant and an absorbent solution in an absorption refrigeration cycle, the absorber being arranged in the closed circuit to receive refrigerant vaporized in the evaporator, the generator normally being operative to supply absorbent solution to the absorber for absorption of the vaporized refrigerant, the condenser normally being operative to supply condensed refrigerant to the evaporator; means defining a chilling circuit for circulating a chilled fluid in heat-exchange relation with a refrigeration load and including a first heat-exchanger in the evaporator for abstracting heat from the fluid and rejecting it to the refrigerant to chill the fluid and to vaporize the refrigerant; and means defining a cooling circuit for circulating a cooling medium and including a second heat-exchanger in the absorber for normally abstracting heat from the absorbent solution and rejecting it to the cooling medium; the steps of removing absorbent solution from the absorber; operating the absorber to condense the vaporized refrigerant by circulating the cooling medium in the second heat-exchanger at a temperature lower than a temperature of the chilled fluid which will satisfy the refrigeration load; and circulating refrigerant condensed in the absorber to the evaporator; said steps being carried out with the generator and the condenser inoperative.

4. The method according to claim 3, including the steps of discontinuing circulation of the condensed refrigerant from the absorber to the evaporator; charging the absorber with absorbent solution; commencing operation of the generator and the condenser; and circulating the cooling medium in the second heat-exchanger at a temperature higher than said temperature of the chilled fluid.

5. In a method of operating a refrigeration system of the type having an evaporator, an absorber, a generator and a condenser connected in a closed circuit normally conducting a refrigerant and an absorbent solution in an absorption refrigeration cycle, the absorber being arranged in the closed circuit to receive refrigerant vaporized in the evaporator, the generator normally being operative to supply absorbent solution to the absorber for absorption of the vaporized refrigerant, the condenser normally being operative to supply condensed refrigerant to the evaporator; means defining a chilling circuit circulating a chilled fluid in heat-exchange relation with a refrigeration load and including a first heat-exchanger in the evaporator for abstracting heat from the fluid and rejecting it to the refrigerant to chill the fluid and to vaporize the refrigerant, the temperature of the chilled fluid leaving the first heat-exchanger normally being maintained within a first range of values; means defining a cooling circuit circulating a cooling medium and including a second heat-exchanger in the absorber for normally abstracting heat from the absorbent solution and rejecting it to the cooling medium, the temperature of the cooling medium entering the second heat-exchanger normally being maintained within a second range of values having an upper limit higher than the upper limit of the first range; the steps of removing absorbent solution from the absorber; operating the absorber to condense the vaporized refrigerant by adjusting the temperature of the cooling medium entering the second heat-exchanger to a value lower than the temperature of the chilled fluid leaving the first heat-exchanger; and conducting refrigerant condensed in the absorber to the evaporator; said steps being carried out with the generator and the condenser inoperative.

6. The method according to claim 5, including the steps of discontinuing circulation of the condensed refrigerant from the absorber to the evaporator; charging the absorber with absorbent solution, commencing operation of the generator and the condenser; and adjusting the temperature of the cooling medium entering the second heat-exchanger to a value within the second range and higher than the temperature of the chilled fluid leaving the first heat-exchanger.

7. In a method of operating a refrigeration system of the type having an evaporator, an absorber, a generator, and a condenser connected in a closed circuit normally conducting a refrigerant and an absorbent solution in an absorption refrigeration cycle, the absorber being arranged in the closed circuit to receive refrigerant vaporized in the evaporator and normally to receive absorbent solution from the generator for absorption of the vaporized refrigerant; means defining a chilling circuit circulating a chilled fluid in heat-exchange relation with a refrigeration load and including a first heat-exchanger in the evaporator for abstracting heat from the fluid and rejecting it to the refrigerant to chill the fluid and to vaporize the refrigerant, the temperature of the chilled fluid leaving the first heat-exchanger normally being maintained within a first range of values; means defining a cooling circuit circulating a cooling medium and including a second heat-exchanger in the absorber for normally abstracting heat from the absorbent solution and rejecting it to the cooling medium, the temperature of the cooling medium entering the second heat-exchanger normally being maintained within a second range of values having an upper limit higher than the upper limit of the first range; and means defining a heating circuit normally conducting flow of a heating medium and including a third heat-exchanger in the generator for normally abstracting heat from the heating medium and rejecting it to the absorbent solution; the steps of discontinuing operation of the generator and the condenser, and thereby interrupting the absorption refrigeration cycle, by discontinuing flow of the heating medium in the third heat-exchanger; removing absorbent solution from the absorber and the generator; operating the absorber to condense the vaporized refrigerant by adjusting the temperature of the cooling medium entering the second heat-exchanger to a value lower than the temperature of the chilled fluid leaving the first heat-exchanger; and circulating refrigerant condensed in the absorber to the evaporator.

8. The method according to claim 7, including the steps of discontinuing circulation of the condensed refrigerant from the absorber to the evaporator; returning the absorbent solution to the absorber and the generator; resuming operation of the generator and the condenser by resuming flow of the heating medium in the third heat-exchanger; and adjusting the temperature of the cooling medium entering the second heat-exchanger to a value within the second range and higher than the temperature of the chilled fluid leaving the first heat-exchanger.

9. In a refrigeration system including an evaporator and an absorber connected in a closed circuit for normally conducting a refrigerant and an absorbent solution in an absorption refrigeration cycle, the absorber being arranged in the closed circuit to receive refrigerant vaporized in the evaporator and normally being provided with absorbent solution for absorption of the vaporized refrigerant; means defining a chilling circuit for circulating a chilled fluid in heat-exchange relation with a refrigeration load and including a first heat-exchanger in the evaporator for abstracting heat from the fluid and rejecting it to the refrigerant to chill the fluid and to vaporize the refrigerant; and means defining a cooling circuit for circulating a cooling medium and including a second heat-exchanger in the absorber for normally abstracting heat from the absorbent solution and rejecting it to the cooling medium; means for operating the absorber to condense the vaporized refrigerant, in the absence of absorbent solution in the absorber, when the temperature of the cooling medium entering the second heat-exchanger is lower than a temperature of the chilled fluid which will satisfy the refrigeration load, the last-mentioned means including bypass passage means communicating at one end thereof with the absorber and at the other end thereof with the evaporator, and bypass valve means associated with the bypass passage means for controlling flow therein, the bypass valve means having a normally closed position and being movable to an open position for the circulation of refrigerant condensed in the absorber to the evaporator.

10. The combination according to claim 9, including refrigerant distribution means in the evaporator for distributing unvaporized refrigerant over the first heat-exchanger; receptacle means in the evaporator below the first heat-exchanger for collecting unvaporized refrigerant; and refrigerant passage means connecting the distribution means and the receptacle means for conducting unvaporized refrigerant from the receptacle means to the distribution means; said other end of the bypass passage means communicating with the refrigerant passage means for circulation of condensed refrigerant from the absorber to the distribution means when the bypass valve means is in its open position.

11. The combination according to claim 10, wherein the refrigerant passage means includes a refrigerant pump having an inlet in communication with the receptacle means and an outlet in communication with the distribution means, the bypass passage means connecting the absorber and the refrigerant pump inlet.

12. The combination according to claim 11, wherein the bypass passage means includes an eductor having an outlet, a suction inlet, and a motive fluid inlet, the eductor outlet communicating with the pump inlet, the eductor suction inlet communicating with the absorber; motive fluid passage means connecting the pump outlet and the motive fluid inlet; and motive fluid valve means being associated with the motive fluid passage means for controlling flow therein; the motive fluid valve means having a normally closed position and being movable to an open position for operating the eductor to withdraw condensed refrigerant from the absorber when the bypass valve means is in its open position.

13. The combination according to claim 9, including means for removing absorbent solution from the absorber and comprising receiver means for storing the absorbent solution, said receiver means having an inlet, receiver passage means communicating at one end thereof with the receiver inlet, a solution pump having an inlet communicating with the absorber and having an outlet communicating with the other end of the receiver passage means, and receiver valve means associated with the receiver passage means for controlling flow therein, the receiver valve means having a normally closed position and being movable to an open position for removal of the absorbent solution from the absorber to the receiver means.

14. The combination according to claim 13, wherein said receiver means has an outlet, second receiver passage means communicating at one end thereof with the receiver outlet and at the other end thereof with the absorber, second receiver valve means being associated with the second receiver passage means for controlling flow therein, the second receiver valve means having a normally closed position and being movable to an open position for removal of absorbent solution from the receiver means to the absorber.

* * * * *

UNITED STATES PATENT OFFICE
CERTIFICATE OF CORRECTION

Patent No. 3,640,084    Dated February 8, 1972

Inventor(s) Neil E. Hopkins et al

It is certified that error appears in the above-identified patent and that said Letters Patent are hereby corrected as shown below:

Column 1, line 41, "abstraction" should read -- abstracting --. Column 6, line 34, "of 1/100" should read -- or 1/100 --. Column 9, line 71, "26°" should read -- 36° --.

Signed and sealed this 24th day of October 1972.

(SEAL)
Attest:

EDWARD M. FLETCHER, JR.
Attesting Officer

ROBERT GOTTSCHALK
Commissioner of Patent